US008945356B2

(12) United States Patent
Le Gallo et al.

(10) Patent No.: US 8,945,356 B2
(45) Date of Patent: Feb. 3, 2015

(54) HIGH TEMPERATURE ELECTROLYZER (HTE) HAVING A STACK OF ELECTROLYSIS CELLS AND IMPROVED OPERATING RELIABILITY AND HIGH EFFICIENCY

(75) Inventors: Patrick Le Gallo, Saint Appolinard (FR); Jean-Luc Sarro, Bourg Saint Andeol (FR); Michel Planque, Seyssins (FR); Magali Reytier, Villard de Lans (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 302 days.

(21) Appl. No.: 13/583,110

(22) PCT Filed: Mar. 11, 2011

(86) PCT No.: PCT/EP2011/053723
§ 371 (c)(1),
(2), (4) Date: Sep. 6, 2012

(87) PCT Pub. No.: WO2011/110674
PCT Pub. Date: Sep. 15, 2011

(65) Prior Publication Data
US 2012/0325654 A1 Dec. 27, 2012

(30) Foreign Application Priority Data

Mar. 12, 2010 (FR) ...................................... 10 51783

(51) Int. Cl.
*C25B 1/12* (2006.01)
*C25B 9/18* (2006.01)
(Continued)

(52) U.S. Cl.
CPC ... *C25B 1/12* (2013.01); *C25B 1/04* (2013.01); *C25B 9/04* (2013.01); *C25B 9/18* (2013.01); *H01M 8/248* (2013.01); *Y02E 60/366* (2013.01)
USPC ............ 204/257; 205/628; 205/338; 204/258

(58) Field of Classification Search
CPC ......................................................... C25B 1/12
See application file for complete search history.

(56) References Cited

U.S. PATENT DOCUMENTS 4,323,443 A * 4/1982 Pere .............................. 204/253
5,401,371 A * 3/1995 Oshima et al. ................ 204/258
(Continued)

FOREIGN PATENT DOCUMENTS

DE 25 49 471 A1 5/1977
FR 2 919 618 A1 2/2009
(Continued)

OTHER PUBLICATIONS

U.S. Appl. No. 14/124,275, filed Dec. 6, 2013, Planque.
(Continued)

*Primary Examiner* — Harry D Wilkins, III
(74) *Attorney, Agent, or Firm* — Oblon, Spivak, McClelland, Maier & Neustadt, L.L.P.

(57) ABSTRACT

A high-temperature module for electrolysis of water with improved operational safety, in which steam containing at most 1% hydrogen can be made to flow simultaneously in each cathode and in each anode, as a draining gas, of a stack of cells. The stack of cells is housed in a sealed case and a mechanism for clamping by compression of the stack is included. The risks of leaks likely to cause impairments of efficiency and breakages of all or part of a stack EHT electrolyzer are reduced, while a high level of efficiency is provided due to the fact that satisfactory electrical conduction is maintained by compression of the stack.

5 Claims, 6 Drawing Sheets

Figure 1:
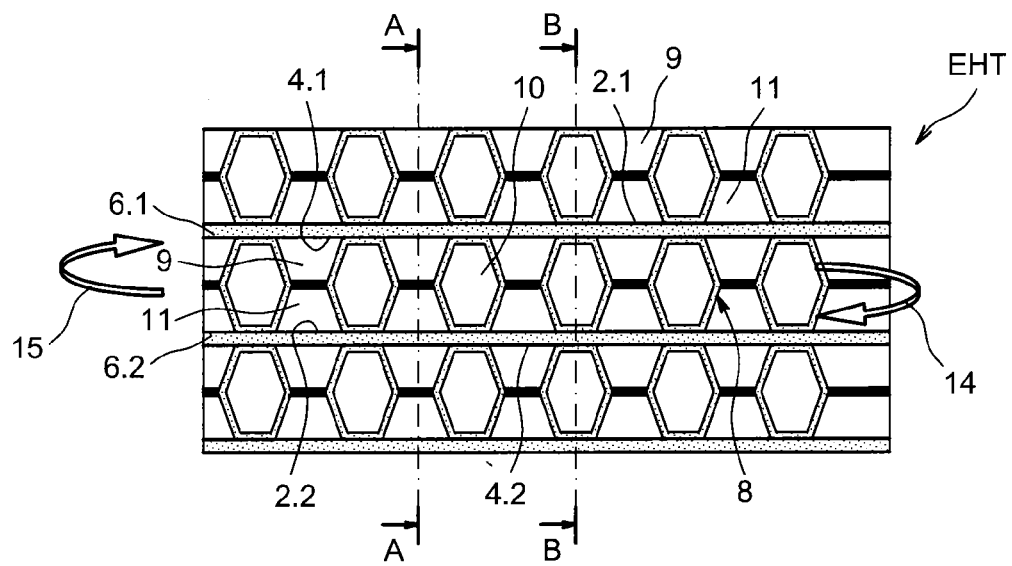

(51) Int. Cl.
*C25B 1/04* (2006.01)
*C25B 9/04* (2006.01)
*H01M 8/24* (2006.01)

(56) References Cited

U.S. PATENT DOCUMENTS

| | | | | |
|---|---|---|---|---|
| 5,783,051 | A * | 7/1998 | Hirai et al. | 204/254 |
| 6,040,072 | A * | 3/2000 | Murphy et al. | 429/470 |
| 6,153,083 | A * | 11/2000 | Hofmann et al. | 205/628 |
| 7,048,839 | B2 * | 5/2006 | Harada | 204/266 |
| 7,153,409 | B2 * | 12/2006 | Shiepe et al. | 205/628 |
| 7,846,307 | B2 * | 12/2010 | Taruya et al. | 204/242 |
| 8,168,048 | B1 * | 5/2012 | Maget | 204/278 |
| 8,317,986 | B2 * | 11/2012 | Le Gallo | 204/258 |
| 8,623,195 | B2 * | 1/2014 | Sioli | 205/628 |
| 8,679,305 | B2 * | 3/2014 | Nakazawa et al. | 204/278 |
| 2002/0146611 | A1 | 10/2002 | Kawasaki et al. | |
| 2003/0141200 | A1 * | 7/2003 | Harada | 205/637 |
| 2004/0072040 | A1 * | 4/2004 | Duffy et al. | 429/21 |
| 2006/0157354 | A1 * | 7/2006 | Harada | 205/637 |
| 2008/0090140 | A1 * | 4/2008 | Dalton et al. | 429/160 |
| 2008/0254333 | A1 | 10/2008 | Yoshino et al. | |
| 2010/0012503 | A1 | 1/2010 | Hinatsu et al. | |
| 2010/0078317 | A1 * | 4/2010 | Bourgeois | 204/258 |
| 2010/0200396 | A1 | 8/2010 | Le Gallo | |
| 2010/0200421 | A1 | 8/2010 | Aujollet | |
| 2012/0325652 | A1 | 12/2012 | Perret | |
| 2012/0325677 | A1 | 12/2012 | Le Gallo | |
| 2013/0032490 | A1 | 2/2013 | Le Gallo et al. | |
| 2013/0168238 | A1 | 7/2013 | Le Gallo et al. | |
| 2013/0244136 | A1 | 9/2013 | Fleury et al. | |

FOREIGN PATENT DOCUMENTS

| | | |
|---|---|---|
| FR | 2 921 389 A1 | 3/2009 |
| WO | WO 2010/006423 A1 | 1/2010 |
| WO | WO 2010/108530 A1 | 9/2010 |

OTHER PUBLICATIONS

U.S. Appl. No. 13/643,043, filed Oct. 25, 2012, Le Gallo et al.
U.S. Appl. No. 13/643,029, filed Nov. 2, 2012, Reytier et al.
International Search Report issued Apr. 15, 2011 in Application No. PCT/EP2011/053723.
Preliminary Search Report issued Aug. 24, 2010 in French Application No. 1051783 (With English Translation of Category of Cited Documents).

* cited by examiner

HIGH TEMPERATURE ELECTROLYZER (HTE) HAVING A STACK OF ELECTROLYSIS CELLS AND IMPROVED OPERATING RELIABILITY AND HIGH EFFICIENCY

TECHNICAL FIELD

The present invention concerns a module with a sealed enclosure combined with a reactor for high-temperature electrolysis (EHT) of water, of the type having a stack of cells, with a view to producing hydrogen.

The module with sealed enclosure according to the invention allows improved operational safety of high-temperature electrolysers, by reducing the risks of leaks which may cause impairments of efficiency and/or possible breakages of all or part of its elements.

The invention relates more particularly to maintenance of the high efficiency of such a module. The term "high temperatures" is understood to mean, in the context of the invention, temperatures at least equal to 450° C., and typically of between 600° C. and 1000° C.

PRIOR ART

A high-temperature electrolyser (EHT), also called high-temperature steam electrolysis (EVHT), of the type with a stack, includes multiple elementary electrolysis cells formed by a cathode and an anode separated by an electrolyte, where the elementary cells are connected electrically in series by means of interconnecting plates, generally interposed between an anode of an elementary cell and a cathode of the following elementary cell. An anode-anode connection followed by a cathode-cathode connection is also possible. The interconnecting plates are electronic conducting components formed by at least one metal plate. These plates also provide the separation between the cathodic fluid flowing in one elementary cell from the anodic fluid flowing in a following elementary cell.

The anode and the cathode are made of a porous material through which the gases can flow.

In the case of electrolysis of water to produce hydrogen at high temperatures, steam flows in the cathode where the hydrogen is generated in gaseous form, and a draining gas can flow in the anode, and by this means collect the oxygen generated in gaseous form at the anode. Most high-temperature electrolysers use air as the draining gas in the anode.

At the current time, management of the gases is therefore complicated since two different gas inlets must be provided, one at the cathode and the other at the anode, together with two different gas outlets, one of which is also at the cathode and the other at the anode.

This complication leads to an increased risk of possible leaks, of their immediate impacts, with the final consequence of more or less substantial impairments of efficiency and/or possible breakages in the electrolyser which may make it inoperative.

To devise a solution seeking to simplify the management of the gases, the inventors considered all the leaks which might occur in the portions of an electrolyser, with the phenomena and their relative qualitative impacts.

The table below summarises this assessment, where the qualitative impacts are, by convention, classified from 0 to 3, where:
  0: zero risk,
  1: low risk,
  2: medium risk: hydrogen may burn,
  3: substantial risk: a large quantity of hydrogen may burn.

| Description | | Species | | | |
|---|---|---|---|---|---|
| From | To | What | in | Phenomenon | Impact |
| Cathode input | Cathode output | $H_2O + H_2$ | $H_2O + H_2$ | dilution | 1 |
| Cathode input | Anode input | $H_2O + H_2$ | Air | incinerated $H_2$ | 2 |
| Anode input | Cathode input | Air | $H_2O + H_2$ | incinerated $H_2$ | 2-3 |
| Anode input | Anode output | Air | Air + $O_2$ | dilution | 1-0 |
| Cathode input | Anode output | $H_2O + H_2$ | Air + $O_2$ | incinerated $H_2$ | 2 |
| Anode input | Cathode output | Air | $H_2O + H_2$ | incinerated $H_2$ | 3 |
| Cathode output | Anode output | $H_2O + H_2$ | Air + $O_2$ | incinerated $H_2$ | 3 |
| Anode output | Cathode output | Air + $O_2$ | $H_2O + H_2$ | incinerated $H_2$ | 3 |
| Cathode input | Air | $H_2O + H_2$ | Air | incinerated $H_2$ | 2 |
| Anode input | Air | Air | Air | Leak without effect | 0 |
| Cathode output | Air | $H_2O + H_2$ | Air | incinerated $H_2$ | 3 |
| Anode output | Air | Air + $O_2$ | Air | loss of oxygen | 0 |

The inventors therefore reached the conclusion that the predominant detrimental phenomenon was that hydrogen burns in contact with air, and that consequently it was necessary to minimise the circulation of hydrogen and air within the electrolyser operating at high temperatures.

A solution seeking to minimise the flow within a high-temperature electrolyser (EHT), of hydrogen and air, in order to reduce the risks of leaks which might cause impairments of efficiency and/or breakages of all or part of the electrolyser resulting from it, consists in causing steam containing at most 1% hydrogen to flow both at the anode (as the draining gas) and at the cathode. In other words, only steam containing at most 1% hydrogen is conveyed in the fluid streams in contact with the anode and the cathode.

Thus, a flow is produced at the inlet of the cathode and the anode, and this flow is in contact across the entire cathode and anode: where the steam containing at most 1% hydrogen initially becomes enriched with hydrogen as it flows in contact with the cathode.

The impairments of efficiency and possible breakages of elements of the electrolyser due to leaks are thereby reduced.

An almost-perfect reaction at the cathode is therefore to be expected, with very little contribution of hydrogen (since the reduction reaction is accomplished in a prior phase, where the quantity of 1% contained in the initial steam is used, if necessary, to maintain the reduced state) and contributing as a draining gas to the anode only very slightly hydrogenated steam.

The very low percentage (at most 1%) of hydrogen present at the anode may combust with the oxygen produced, without any detrimental consequence.

By this means it is possible to avoid the use of sophisticated sealing solutions, more specifically in terms of the passage through an interconnector below the anode along a duct for recovering the produced hydrogen. Indeed, in these terms, if a leak does indeed occur, the steam becomes sandwiched, forming in some sense a water seal or water cushion. The leak in some way represents a dilution.

Fewer seals must therefore be made. The architecture of an electrolyser with a stack of electrolysis cells can thus be simplified.

It is also possible to make use of the released oxygen more easily. Indeed, the blend recovered at the anode consists almost entirely of steam and oxygen. The steam downstream from the electrolyser can be condensed easily. It is therefore possible to recover pure, oxygen which can be used thereafter. For example, the recovered pure oxygen can be used in the chemicals industry.

To improve still further the operational safety of an EHT electrolyser with a stack of cells, the inventors also had the idea of manufacturing a module for high-temperature electrolysis, including a sealed casing designed to contain steam containing at most 1% hydrogen, or an inert gas, and where the stack of electrolysis cells is housed in the sealed casing.

With such a module the seals of the electrolyser to be manufactured are less critical than for those of a conventional electrolyser. Indeed, if the sealed casing includes an inert gas or steam containing at most 1% hydrogen, the electrolyser is then kept in an atmosphere which does not react with hydrogen. In addition, if the atmosphere is steam containing at most 1% hydrogen then, compared to a conventional electrolyser, the design of the electrolyser's fluid system is less complex, since it is possible to have a single inlet for the anode and the cathode, which emerges directly inside the sealed casing. Fewer improved seals must therefore be made, compared to a conventional electrolyser.

Operational safety is increased in both for the electrolyser and the nearby environment. It is also possible to pressurise the high-temperature electrolyser. Conversely, such pressurisation of the electrolyser implies that a solution is defined enabling the counter-pressure likely to be exerted by the steam or the inert gas on the sealed casing to be ensured and controlled.

In addition, in such a module, the efficiency of the stack electrolyser continues to depend on the quality of conduction of the current through the stack, and therefore on the compression or contact force, also called the clamping force, applied to the stack.

The aim of the invention is therefore to propose a module for high-temperature electrolysis, including a sealed casing designed to contain steam containing a most 1% hydrogen, or an inert gas, and to house a stack of electrolysis cells, which enables both the clamping, i.e. the compression, of the stack and the counter-pressure likely to be exerted by the steam or inert gas on the sealed casing to be ensured and controlled.

DESCRIPTION OF THE INVENTION

To accomplish this, according to a first embodiment, the object of the invention is a module for high-temperature electrolysis, including
  a sealed casing designed to contain steam containing at most 1% hydrogen, or an inert gas,
  a stack of elementary electrolysis cells, each formed of a cathode, an anode and an electrolyte sandwiched between the cathode and the anode, where at least one interconnecting plate is fitted between two adjacent elementary cells, in electrical contact with an electrode of one of the two elementary cells and an electrode of the other of the two elementary cells, where the interconnecting plate includes at least one cathodic compartment and at least one anodic compartment for gas to flow respectively in the cathode and in the anode, and where the stack of electrolysis cells is housed in the sealed casing, in which the sealed casing consists of a case including a base and a cover which are securely attached to one another, where the stack of elementary electrolysis cells is assembled between two plates, the lower plate of which is resting on the base of the box through an electrical insulator, in which clamping means are fitted at least partly between the upper plate and the cover of the case, where the clamping means are designed to provide a determined contact force by compression between the lower and upper plates of the stack of cells, in which clamping means include an additional plate installed with a loose fit in the case and in direct contact with the upper plate, where the additional plate is designed to be moved by the steam containing at most 1% hydrogen from outside the case through the cover, where the movement of the additional plate causes a clamping force between the lower and upper plates, and where the fit enables the stack of cells to be supplied at least partially with steam containing at most 1% hydrogen.

According to a second embodiment of the invention the lower plate is resting directly on the base of the case, and the clamping means are designed to apply a load by gravity from outside the case, on the upper plate, through a bellows which is securely attached, in a sealed manner, to the cover of the case, and where an electrically insulating part which enables the load applied to be transmitted is fitted inside the case between the bellows and the upper plate.

Advantageously, the connections are fitted through the base of the case without any electrical contact with their attachment to the case, and allowing electrical connection to the stack of electrolysis cells from outside the case.

The advantage of the second embodiment compared to the first embodiment is that it is possible for the different functions to be kept completely independent, namely supply of electrical power to the stack, supply of minimally hydrogenated or unhydrogenated steam to the stack, supply of minimally hydrogenated or unhydrogenated steam to the interior of the sealed case, and clamping by compression of the stack of electrolysis cells. By this means, it is in fact possible to ensure and control each of these functions more precisely.

Electrolysis of water according to the invention can occur at temperatures of over 450° C., typically between 600° C. and 1000° C.

A stack of elementary electrolysis cells, each formed of a cathode, an anode and an electrolyte sandwiched between the cathode and the anode, is preferably provided where at least one interconnecting plate is fitted between two adjacent elementary cells, in electrical contact with an electrode of one of the two elementary cells and an electrode of the other of the two elementary cells, where the interconnecting plate includes at least one cathodic compartment and at least one anodic compartment for gas to flow respectively in the cathode and in the anode, and where the stack of electrolysis cells is housed in the sealed casing.

According to an advantageous embodiment, the sealed casing consists of a case including a base and a cover which are securely attached to one another, and where the stack of elementary electrolysis cells is assembled between two plates, the lower plate of which is resting on the base of the case through an electrical insulator. By this means the risk of electrical short-circuit of the stack of cells is prevented.

It is also possible to incorporate the clamping function of the electrolyser directly in the case: this has the advantage that there is thus no requirement to make additional openings and the associated seals, which are required with clamping means outside the case. Clamping means are thus fitted between the upper plate and the cover of the case, where the clamping means are designed to provide a determined contact force between the interconnecting plates and the electrodes.

It is possible to have several variant embodiments of the clamping means fitted between the upper plate and the cover of the case: this can be a simple rigid spacer of calibrated height, or a jack.

The invention also concerns an assembly including:
- a module for high-temperature electrolysis according to one of the two previously described embodiments,
- a source of supply of steam containing at most 1% hydrogen, or of inert gas, connected to the interior of the module's sealed casing.

The inert gas may be chosen from among nitrogen or argon. It is here stipulated that the inert gas in the sense of the invention means inert with regard to hydrogen and oxygen.

BRIEF DESCRIPTION OF THE ILLUSTRATIONS

Figure 1A:
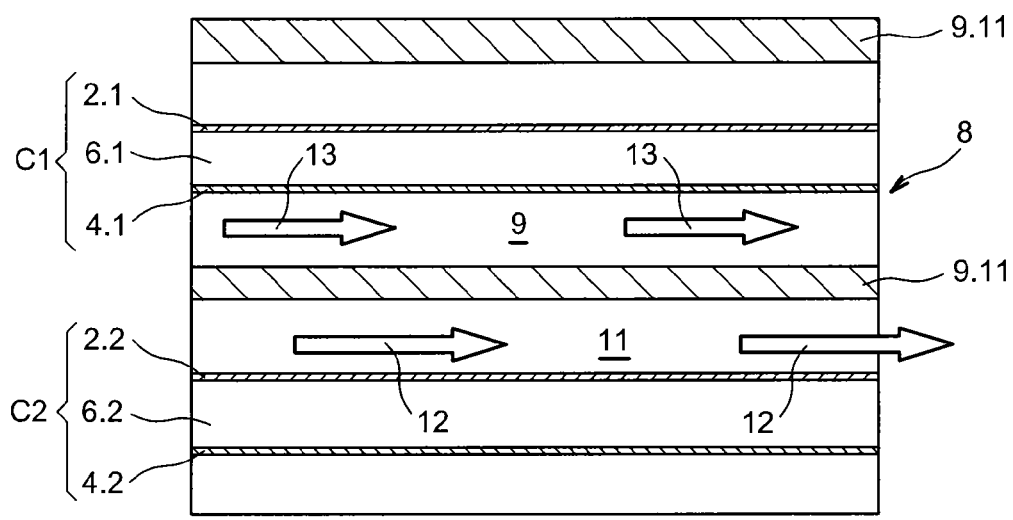
Figure 1B:
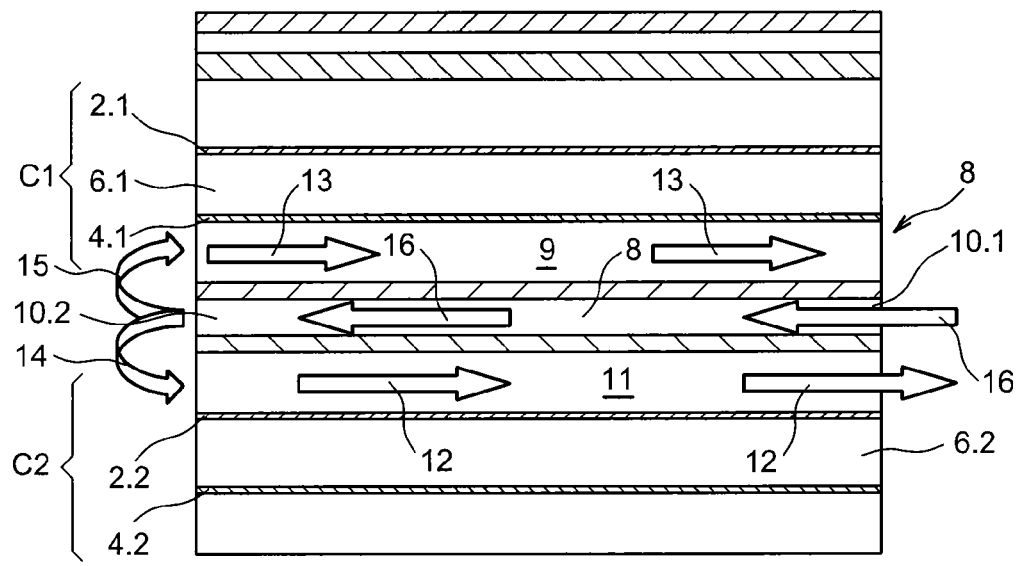
Figure 2:
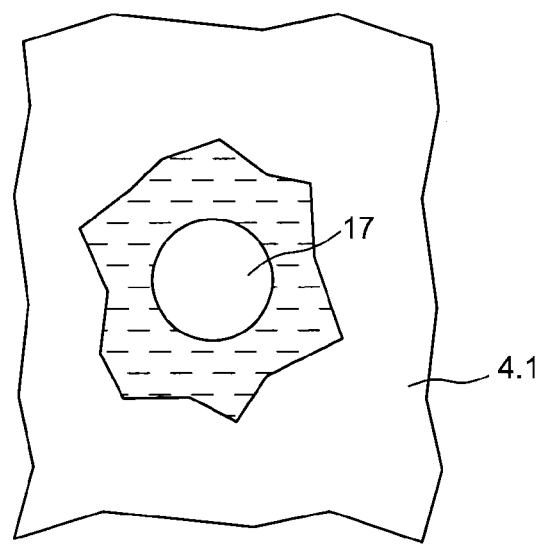
Figure 3:
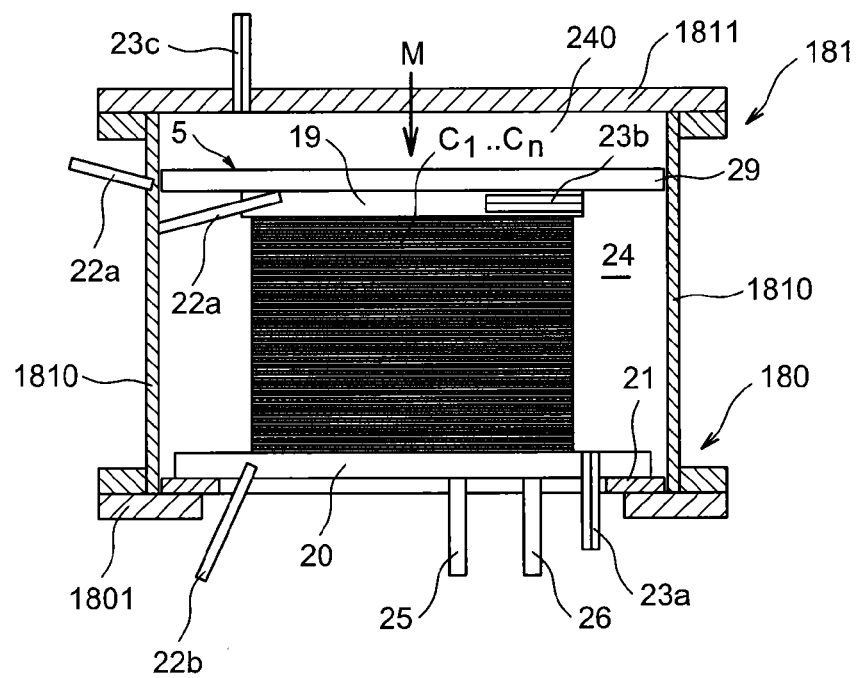
Figure 5:
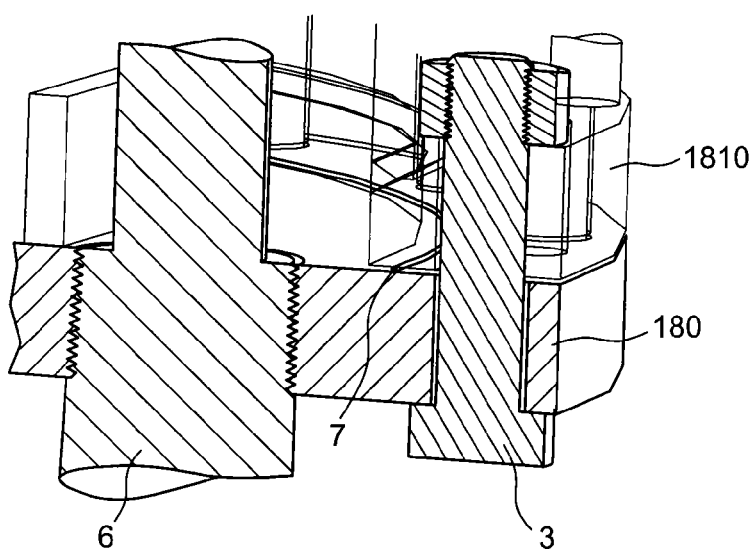
Figure 4A:
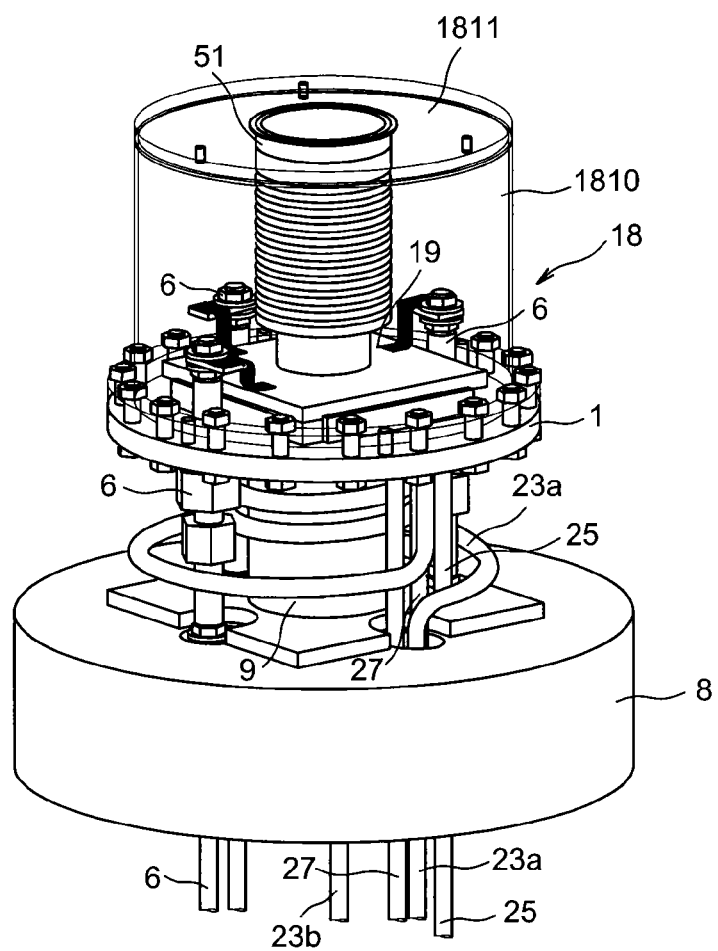
Figure 4B:
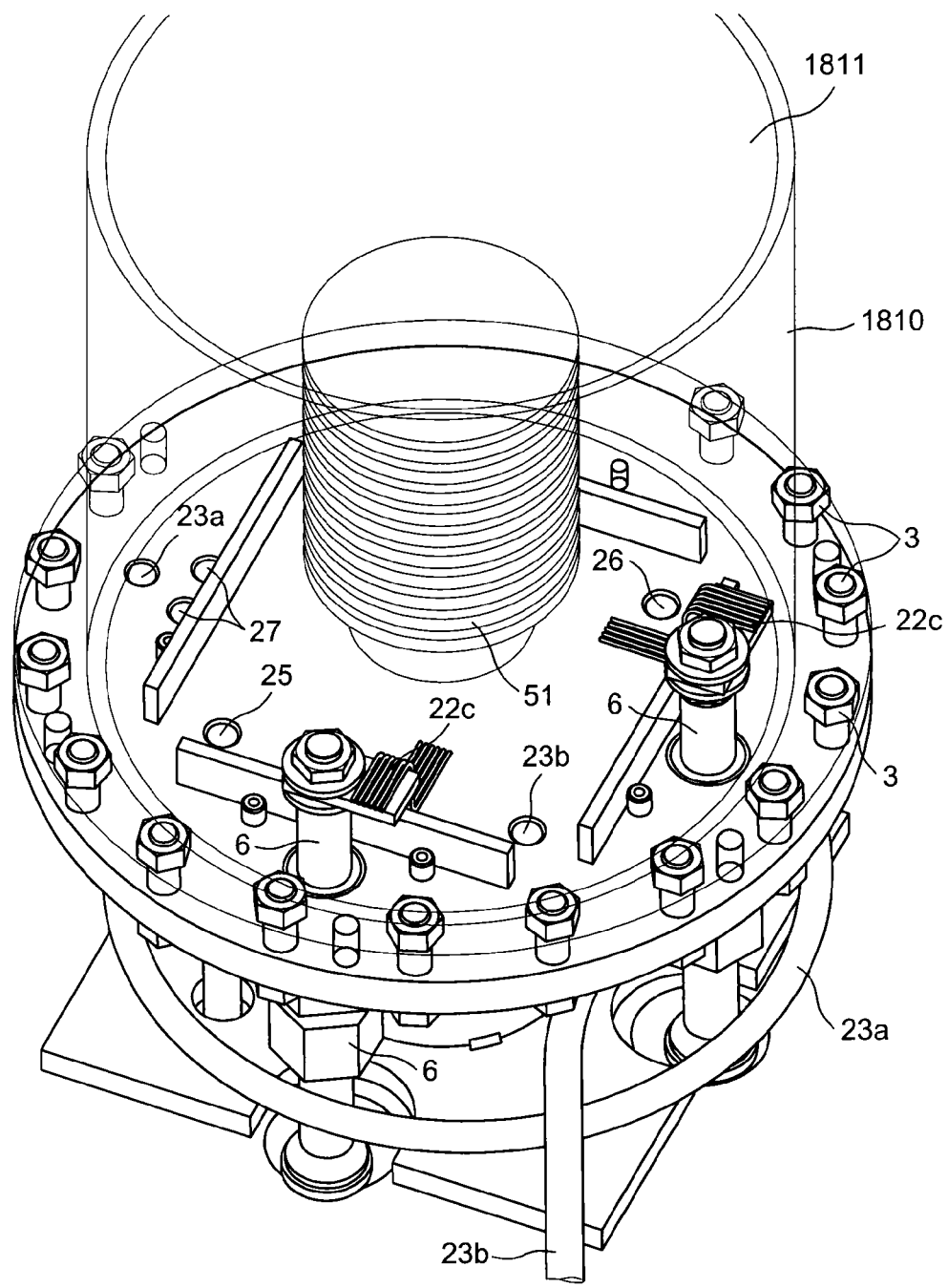
Figure 4C:
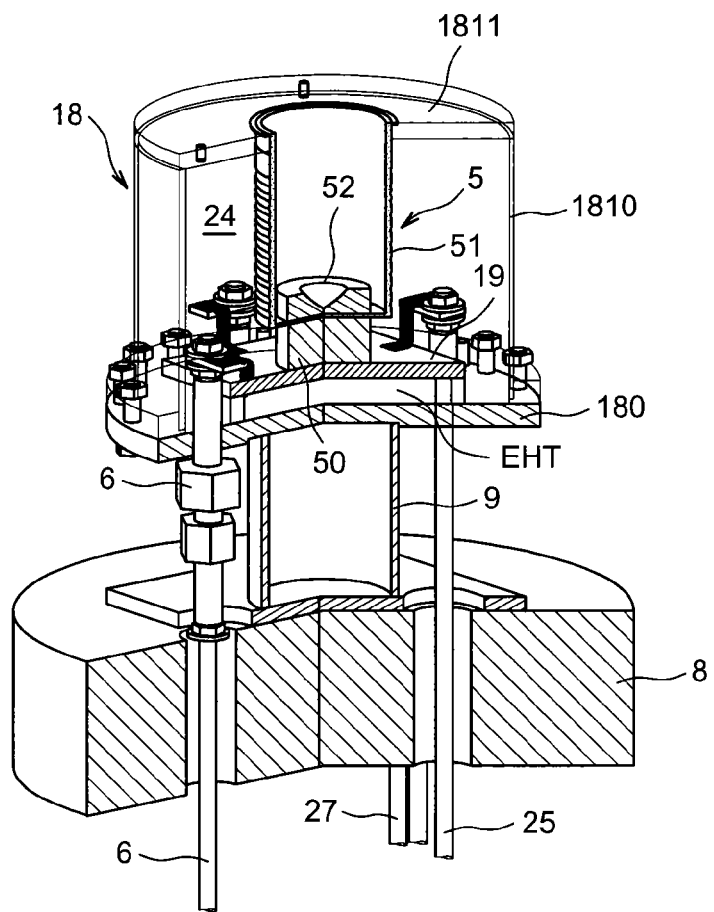

Other advantages and characteristics will be seen more clearly on reading the detailed description made with reference to the following figures, among which:

FIG. 1 is a side view of an embodiment of a reactor for high-temperature electrolysis according to the present invention, FIG. 1A is a section view of the reactor of FIG. 1 in plane A-A during normal operation of electrolysis, i.e. without breakage of electrolysis cells, FIG. 1B is a section view of the reactor of FIG. 1 in plane B-B, also during normal operation, FIG. 2 is a diagrammatic view illustrating a phenomenon which may occur within the reactor according to the invention, FIG. 3 is a diagrammatic view of a module with a sealed case in which a reactor for high-temperature electrolysis incorporating clamping means is housed, respectively according to a first embodiment, FIGS. 4A to 4C are diagrammatic partial cutaway, partial section perspective views of a module with a sealed case in which a reactor for high-temperature electrolysis incorporating clamping means is housed, respectively according to a second embodiment;

FIG. 5 is a partial section perspective view of the seal made between the base and cover of a sealed case according to the invention.

DETAILED ACCOUNT OF PARTICULAR EMBODIMENTS

The invention is described in relation to a type of architecture of high-temperature water electrolyser to generate hydrogen. It is self-evident that the invention may apply to other architectures. The high temperatures at which the represented electrolyser operates are between 600° C. and 1000° C.

It is stipulated that the terms "upstream" and "downstream" are used with reference to the direction of flow of the steam and of the hydrogen produced at the cathode.

It is stipulated that the terms "lower" and "upper" are used with reference to the installed configuration of the electrolyser in the case according to the invention: thus, the upper plate is the highest plate and the lower plate is the lowest plate.

It is stipulated that the representations of the different elements are not to scale.

In FIG. 1 an EHT electrolyser according to the present invention has been represented, including multiple stacked elementary cells C1, C2, etc.

Each elementary cell includes an electrolyte positioned between a cathode and an anode.

In the remainder of the description we shall describe cells C1 and C2 and their interface in detail.

Cell C1 includes a cathode 2.1 and an anode 4.1 between which is positioned an electrolyte 6.1, for example a solid electrolyte, generally 100 µm thick in the case of cells called "electrolyte support" cells and several µm thick in the case of cells called "cathode support cathode" cells.

Cell C2 includes a cathode 2.2 and an anode 4.2 between which an electrolyte 6.2 is positioned.

Cathodes 2.1, 2.2 and anodes 4.1, 4.2 are made of a porous material and are, for example, 40 µm thick in the case of "electrolyte support" cells and of the order of 500 µm and 40 µm thick respectively in the case of "cathode support" cells.

Anode 4.1 of cell C1 is connected electrically to cathode 2.2 of cell C2 by an interconnecting plate 8 which comes into contact with anode 4.1 and cathode 2.2. In addition, it allows anode 4.1 and cathode 2.2 to be powered electrically.

An interconnecting plate 8 is interposed between two elementary cells C1, C2. In the represented example it is interposed between an anode of an elementary cell and the cathode of the adjacent cell. But it could be interposed between two anodes or two cathodes.

Interconnecting plate 8 defines, with the adjacent anode and adjacent cathode, channels through which fluids flow. More specifically, they define anodic compartments 9 dedicated to the flow of the gases in anode 4 and cathodic compartments 11 dedicated to the flow of the gases in cathode 2.

In the represented example an anodic compartment 9 is separated from a cathodic compartment by a wall 9.11. In the represented example, interconnecting plate 8 also includes at least one duct 10 delimiting, with wall 9.11, anodic compartments 9 and cathodic compartments 11.

In the represented example the interconnecting plate includes multiple ducts 10 and multiple anodic compartments 9 and cathodic compartments 11. Advantageously, duct 10 and the compartments have hexagonal honeycomb sections, which enables the density of compartments 9, 11 and ducts 10 to be increased.

As represented in FIG. 1A, steam containing at most 1% hydrogen, which is preferably exclusively unhydrogenated, is made to flow at each cathode 2.1, 2.2 and at anode 4.1, 4.2 as a draining gas. Arrows 12 and 13 of FIG. 1A thus clearly represent the simultaneous path, of equal pressure, of the unhydrogenated steam in anodic compartments 9 and cathodic compartments 11. It is self-evident that in the context of the invention the flow which is represented symbolically can equally be so represented in the other direction (arrows 12 and 13 in the opposite or contrary direction).

As represented in FIG. 1B, the architecture of the electrolyser also enables first end 10.1 of duct 10 to be connected to a supply of exclusively unhydrogenated steam via another duct, and second end 10.2 of duct 10 to be connected both to anodic compartment 9 and cathodic compartment 11. Arrows 14 and 15 thus represent symbolically the return flow of the unhydrogenated steam from its flow in duct (arrows 16) respectively towards anodic compartment 9 and cathodic compartment 11.

Compared to a conventional EHT electrolyser, the circulation at once in the anode and in the cathode of unhydrogenated steam enables the risks of leaks likely to cause impairments of efficiency and/or breakages of all or part of the electrolyser resulting from it to be reduced.

In particular, as represented in FIG. 2, no sophisticated seal must be made in the area of the passage through anode 4.1 by duct 17 collecting the hydrogen produced by electrolysis according to the invention. As is moreover represented symbolically in the irregular dotted area in this FIG. 2, in the event of a leak in this junction between anode 4.1 and duct 17 collecting hydrogen $H_2$, a sort of water cushion constituting a seal for the oxygen released in anode 4.1 is formed by dilution of hydrogen $H_2$ in the unhydrogenated steam (which is necessarily by design at high pressure compared to the hydrogen and oxygen produced by the electrolysis reaction). In other words, the unhydrogenated steam is used to create a buffer dilution zone between risk zones (hydrogen collection and oxygen production).

The electrolyser thus has improved operational safety, since the risks of leaks with impact likely to cause impairments of efficiency and breakages of all or part are reduced.

The operation of the electrolyser described above can thus be summarised as follows: the unhydrogenated steam, which may possibly be pre-heated, enters duct 10 via supply duct 10.3. When it moves in duct 10 it is heated by heat exchange with the cathode and the anode lining interconnecting plate 8.

This unhydrogenated steam which has been heated to a temperature close to that of cell C1 firstly enters cathodic compartment 11 through end 10.2 (arrow 14 of FIG. 1B), in which it is subject to a reduction when it comes into contact with cathode 2.2. Hydrogen is then generated according to the following reaction:

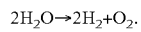
$$2H_2O \rightarrow 2H_2 + O_2.$$

The generated hydrogen is then collected in dedicated collection duct 17.

Simultaneously with this, this heated, exclusively unhydrogenated steam enters anodic compartment 9 through end 10.2 (arrow 15 of FIG. 1B), in which it constitutes a draining gas of the oxygen collected in anode 4.1.

Due to the fact that only unhydrogenated steam must be used as the supply for the EHT electrolyser, and to the fact that there are fewer seals to be made, the inventors also had the idea of housing the EHT electrolyser in a sealed casing, and making an atmosphere of inert gas or unhydrogenated steam, instead of, as conventionally, keeping it as an atmosphere of open air.

This thus enables the EHT stack electrolyser to be pressurised.

As represented in FIGS. 3 and 4A-4B, a module M can thus be defined with, as its sealed casing, a case 18 housing the EHT electrolyser described above. This case 18 can be made by assembling several parts to one another, typically by welding. By means of cases 18 according to FIGS. 3 to 5 and their assembly, the EHT electrolyser can typically be made to operate at pressures of the order of 30 bar.

More specifically, represented case 18 includes a base 180 and a cover 181 which are securely attached to one another, typically by bolts 3 or braces on the outside, as can be seen more easily in FIG. 5.

Base 180 in this case consists of a pierced horizontal bracket 1801. As is better explained below, the various fluid connections in the form of tubes emerge in base 180, 1801.

Cover 181, for its part, consists of a vertical partition 1810 and a horizontal partition 1811.

Two plates, a lower one 19 and an upper one 20, are fitted pressing together, with direct contact either side of the stack of electrolysis cells C1, C2 . . . Cn. These plates, the lower one 19 and the upper one 20, can of course be in direct contact with an interconnecting plate 8, or each constitute an interconnecting plate 8

Lower plate 20 can be pressing against a part made of an electrical insulator 21 forming a spacer, which is itself pressing against base 1801 of case 18, in order to insulate electrically the stack of electrolysis cells C1, C2 . . . Cn as shown in the embodiment of FIG. 3.

Upper plate 19, for its part, exerts a clamping force clamping the stack of cells against the lower plate, i.e. a contact force determined by compression between interconnecting plates 8 and electrodes 2, 4 of the stack of cells C1, . . . Cn, by means of clamping means 5 described in detail below Cover 181 and base 180 of the case, together with lower plate 19 and upper plate 20, are preferably made of heat-resisting steel of the AISI 310 type Electrical connections 22a, 22b, 22c are fitted in order to convey the electrical current to the stack of cells C1, C2 . . . Cn. In the embodiment of figure these electrical connections 22a, 22b are fitted firstly from the outside of case 18 to vertical partition 1810 and from this partition 1810 to upper plate 19 (connections 22a), and secondly from the outside of the case to lower plate 20 (connection 22b). In the embodiment of FIGS. 4A to 4C the electrical power is provided by means of three electrically insulating sealed passages 6 through base 180 of case 18, which are preferably welded to the latter. Typically, these may be electrical connections of the Spectite® brand, each allowing a current of the order of 30 amperes to pass without electrical contact with their attachment to the case. Each of these connections includes within it an electrical connection 22c. To finalise the electrical connection it may be envisaged to use conducting wires typically made of nickel connecting each connection 22c to upper plate 19.

A fluid collection 23a is fitted to convey the pressurised unhydrogenated steam to interior 24 of the sealed casing constituted by case 18. This connection 23a traverses base 180

Another fluid connection 23b is fitted to convey the pressurised unhydrogenated steam to the interior of the EHT electrolyser having the stack of cells C1, C2 . . . Cn. The steam is thus roughly at the same pressure in each anode and each cathode.

In the embodiment of FIG. 3 this other connection 23b enables the steam to be supplied from interior 24 of sealed case 18, and traverses upper plate 19. In the embodiment of FIGS. 4A to 4C this other connection 23b allows the steam to be supplied in the stack of electrolysis cells independently of the supply of steam to interior 24 of sealed case 18. In addition, as represented, a fluid connection 25 traversing lower plate 20 and base 180 of case 18 is designed to collect the hydrogen $H_2$ produced by electrolysis at the different cathodes of the stack of the EHT.

Lastly, another fluid connection 26, also traversing lower plate 20 and base 180 of case 18 is designed to collect the oxygen $O_2$ produced at the different anodes of the stack of the EHT.

All tubes 23a, 23b supplying steam or collecting hydrogen 25 and oxygen 26 produced in the stack EHT are made of AISI 316L stainless steel.

As represented in FIGS. 4A to 4C, it is also possible for tubes 27 to be brought through base 180 of case 18 in order to pass through instrumentation means notably enabling the composition of the minimally hydrogenated steam, its pressure, its temperature, etc. to be controlled. To guarantee the seal between the interior of sealed case 24 and the exterior, only one or several seals 7 of simple design must be installed. In the embodiment of FIG. 3 these seals can be fitted respectively between insulating spacer 21 and bracket 1801, between the insulating spacer and lower plate 20, between cover 181 and vertical partition 1800 and between bracket 1801 and vertical partition 1800. In the embodiment of FIGS. 4A to 4C, it is possible for a single seal 7 to be fitted to the periphery between base 180 and vertical partition 1810 of cover 181. In FIG. 5 such a preferred fitting of a seal 7 has been represented. This seal 7 of circular section is of a general O-ring form, and as shown it is crushed during assembly by the tightening of bolts 3, between partition 1810 and base 180. A seal 7 made of gold is preferably used for its lesser oxidation and soiling qualities, which also permit a perfect seal, and easy assembly/disassembly.

Clamping means 5 are fitted at least partly in interior 24 of sealed case 18 to provide the clamping force determined by compression of the stack of electrolysis cells between upper plate 19 and lower plate 20.

In the embodiment of FIG. 3, clamping means 5 include an additional plate 29 assembled with a loose fit relative to vertical partition 1810 of case 18. This additional plate 29 is in direct contact with upper plate 19. Additional plate 29 can be moved by the steam containing at most 1% hydrogen from the exterior of the case through cover 181 by another fluid connection 23c. In this case the unhydrogenated or minimally hydrogenated steam enters chamber 240 created between additional plate 29 and cover 181, and it leaks laterally in the fit, thus enabling the stack of cells to be at least partially supplied with steam containing at most 1% hydrogen, due to the load loss caused by the leak. In this case fluid connection 23a is used as a secondary inlet for the unhydrogenated steam, in order to adjust the flow rate required for the stack to accomplish the electrolysis. The movement of additional plate 29 causes the clamping force by compression between lower plate 20 and upper plate 19. In other words, clamping means 5 are provided in pneumatic fashion by minimally hydrogenated or unhydrogenated steam, which is also used for supplying the stack of EHT cells for the purpose of electrolysis.

In the embodiment of FIGS. 4A to 4C, clamping means 5 are designed to apply an unrepresented gravitational load from the exterior through a metal bellows 51, whilst providing the electrical insulation of the stack relative to sealed case 18. This metal bellows 51 is welded to cover 181 of the case, or more precisely to horizontal partition 1811. Thus, when the electrolyser is in operation, bellows 51 is maintained at the operating temperatures, typically between 600° C. and 1000° C., which are the temperatures of the steam supplied to interior 24 of the case. In addition, bellows 52 is at the electrical potential of base 180 of case 18. The gravity load presses on the stack of the EHT electrolyser by means of an insulating part 50 and of first mass 52. Insulating part 50 can advantageously be an alumina circular blank. Through the interior of bellows 51 it is possible to transmit via a rod resting on first mass 52 the clamping forces proportional to masses constituting the gravity load. These masses are fitted outside case 18 and, if applicable, outside a furnace in which case 18 can be fitted. Such a furnace enables case 18 and the steam within it to be heated to, and maintained at, high electrolysis temperatures (600-1000° C.)

The advantage of the embodiment of FIGS. 4A to 4c compared to that of FIG. 3 is essentially that it provides total uncoupling between the electrical supply of the stack, supply of minimally hydrogenated or unhydrogenated steam of the stack, supply of minimally hydrogenated or unhydrogenated steam of the interior of the sealed case, and clamping by compression of the stack of electrolysis cells.

Thus, in the embodiment of FIGS. 4A to 4C, interior 24 of the case 18 can easily be supplied with a gas which is inert relative to the produced $O_2$ and $H_2$, and clamping means 5 are mechanical, and can easily be controlled from outside the case (gravitational load), without any consequence for the steam supplying the stack.

Comparatively, a module of FIG. 3 made with a sealed case containing an inert gas within it requires other different fluid connections to supply the EHT electrolyser with steam.

Moreover, for purposes of simplicity of assembly and use, case 18 is fitted on a base 8 through a stand 9. The invention which has just been described, and which consists in causing exclusively unhydrogenated steam to flow concomitantly at the anode and at the cathode, in housing the EHT stack electrolyser in the sealed case, in ensuring and controlling the clamping by compression of the stack from outside the sealed case and also the counter-pressure of the steam. On the one hand this enables the operational safety of electrolyser to be improved by reducing the risks of leaks with notable impact, i.e. those likely to lead to impairments of efficiency and/or breakages, and on the other hand it enables a high level of efficiency to be maintained due to the quality of electrical conduction in the stack By means of the invention, since there is a lesser number of seals to be made, the manufacture of a high-temperature electrolyser can be simplified.

Although not described in detail, it is self-evident that one or more layers of materials can be deposited on each of the three constituents (anode, cathode, electrolyte) of a cell, and also on the interconnectors or interconnecting plates.

The invention claimed is:

1. A module for high-temperature electrolysis, comprising:
   a sealed casing configured to contain steam containing at most 1% hydrogen, or an inert gas;
   a stack of elementary electrolysis cells, each formed of a cathode, an anode, and an electrolyte sandwiched between the cathode and the anode, wherein at least one interconnecting plate is fitted between two adjacent elementary cells, in electrical contact with an electrode of one of the two elementary cells and an electrode of the other of the two elementary cells, wherein the interconnecting plate includes at least one cathodic compartment and at least one anodic compartment for gas to flow respectively in the cathode and in the anode, and wherein the stack of electrolysis cells is housed in the sealed casing;
   in which the sealed casing includes a case including a base and a cover that are securely attached to one another, wherein the stack of elementary electrolysis cells is assembled between an upper and a lower plate, the lower plate of which is resting on the base of the box through an electrical insulator;
   in which clamping means is fitted at least partly between the upper plate and the cover of the case, wherein the clamping means is configured to provide a determined contact force by compression between the lower plate and upper plate of the stack of cells;
   in which the clamping means includes an additional plate installed with a loose fit in the case and in direct contact with the upper plate, wherein the additional plate is configured to be moved by the steam containing at most 1% hydrogen from outside the case through the cover, wherein movement of the additional plate causes a clamping force between the lower and upper plates, and wherein the fit enables the stack of cells to be supplied at least partially with steam containing at most 1% hydrogen.

2. An assembly including:
a module for high-temperature electrolysis according to claim 1;
a source of supply of steam containing at most 1% hydrogen, or of inert gas, connected to the interior of the module's sealed casing.

3. An assembly according to claim 2, wherein the inert gas is chosen from among nitrogen or argon.

4. A module for high-temperature electrolysis, comprising:
a sealed casing configured to contain steam containing at most 1% hydrogen, or an inert gas,
a stack of elementary electrolysis cells, each formed of a cathode, an anode, and an electrolyte sandwiched between the cathode and the anode, wherein at least one interconnecting plate is fitted between two adjacent elementary cells, in electrical contact with an electrode of one of the two elementary cells and an electrode of the other of the two elementary cells, wherein the interconnecting plate includes at least one cathodic compartment and at least one anodic compartment for gas to flow respectively in the cathode and in the anode, and wherein the stack of electrolysis cells is housed in the sealed casing;
in which the sealed casing includes a case including a base and a cover which are securely attached to one another, wherein the stack of elementary electrolysis cells is assembled between an upper and a lower plate, the lower plate of which is resting directly on the base of the box;
in which clamping means is fitted at least partly between the upper plate and the cover of the case, wherein the clamping means is configured to provide a determined contact force by compression between the lower plate and upper plate of the stack of cells;
in which the clamping means is further configured to apply a gravitational load from outside the case, on the upper plate through a bellows which is securely attached, forming a seal, to the cover of the case, and wherein an electrically insulating part which enables the applied load to be transmitted is fitted to the interior of the case between the bellows and the upper plate.

5. A module for high-temperature electrolysis, according to claim 4, further comprising connections fitted through the base of the case without any electrical contact with their attachment to the case, and allowing electrical connection to the stack of electrolysis cells from outside the case.

* * * * *